US009536351B1

(12) United States Patent
Côté

(10) Patent No.: US 9,536,351 B1
(45) Date of Patent: Jan. 3, 2017

(54) THIRD PERSON VIEW AUGMENTED REALITY

(71) Applicant: Bentley Systems, Incorporated, Exton, PA (US)

(72) Inventor: Stéphane Côté, Lac Beauport, CA (US)

(73) Assignee: Bentley Systems, Incorporated, Exton, PA (US)

( * ) Notice: Subject to any disclaimer, the term of this patent is extended or adjusted under 35 U.S.C. 154(b) by 310 days.

(21) Appl. No.: 14/171,171

(22) Filed: Feb. 3, 2014

(51) Int. Cl.
    *H04N 7/00*     (2011.01)
    *G06T 19/00*    (2011.01)
    *H04N 5/232*   (2006.01)

(52) U.S. Cl.
    CPC ......... *G06T 19/006* (2013.01); *H04N 5/23238* (2013.01)

(58) Field of Classification Search
    CPC ..... F01C 1/22; F02B 19/108; F02B 2053/005; F02B 53/10; F02B 53/12; F02B 55/08; F02B 55/14; Y02T 10/125; Y02T 10/17
    USPC .......................................................... 348/39
    See application file for complete search history.

(56) References Cited

U.S. PATENT DOCUMENTS

| 5,913,727 | A | * | 6/1999 | Ahdoot | A63F 13/06 345/156 |
|---|---|---|---|---|---|
| 5,930,741 | A | * | 7/1999 | Kramer | A63B 69/3608 340/524 |
| 6,753,828 | B2 | * | 6/2004 | Tuceryan | G02B 27/017 345/157 |
| 6,774,869 | B2 | * | 8/2004 | Biocca | A41D 31/0088 345/7 |
| 7,256,779 | B2 | * | 8/2007 | Donnelly | A63F 13/10 345/421 |
| 8,355,041 | B2 | * | 1/2013 | Chen | H04N 5/23238 348/14.12 |
| 8,368,753 | B2 | * | 2/2013 | Zalewski | H04N 7/18 345/419 |

(Continued)

OTHER PUBLICATIONS

Zhou et al, Streaming Location-based Panorama Video into Augmented Virtual Environment, 2014.*

(Continued)

*Primary Examiner* — Shan Elahi
(74) *Attorney, Agent, or Firm* — Cesari and McKenna; James A. Blanchette

(57) ABSTRACT

In one embodiment, a panoramic camera captures a panorama of the physical environment visible from a position within the physical environment. An orientation sensor determines an orientation of a handheld device. Based on the orientation of the handheld device, a backend augmentation application selects a portion of the captured panorama visible in a corresponding orientation from the position to produce a view of the physical environment. The view of the physical environment shows physical features of the physical environment and at least a portion of the user's body. The backend augmentation application augments the view of the physical environment to merge computer-generated features with the view of the physical environment to create an augmented reality view. The augmented reality view shows a relationship between the portion of the user's body, the physical features, and the computer-generated features. The augmented reality view is displayed on the handheld device.

21 Claims, 4 Drawing Sheets

(56) References Cited

U.S. PATENT DOCUMENTS

| | | | | |
|---|---|---|---|---|
| 8,786,675 B2* | 7/2014 | Deering | G09G 3/02 | 348/36 |
| 8,834,168 B2* | 9/2014 | Peters | G09B 5/02 | 345/427 |
| 8,896,655 B2* | 11/2014 | Mauchly | H04N 5/23238 | 348/14.06 |
| 2002/0080094 A1* | 6/2002 | Biocca | A41D 31/0088 | 345/8 |
| 2002/0105484 A1* | 8/2002 | Navab | G02B 27/017 | 345/8 |
| 2002/0113756 A1* | 8/2002 | Tuceryan | G02B 27/017 | 345/8 |
| 2004/0087366 A1* | 5/2004 | Shum | A63F 13/06 | 463/36 |
| 2005/0037844 A1* | 2/2005 | Shum | A43B 1/0036 | 463/36 |
| 2005/0083248 A1* | 4/2005 | Biocca | A41D 31/0088 | 345/8 |
| 2005/0128286 A1* | 6/2005 | Richards | G06F 3/04815 | 348/36 |
| 2006/0038833 A1* | 2/2006 | Mallinson | A63F 13/02 | 345/633 |
| 2007/0182812 A1* | 8/2007 | Ritchey | H04N 5/2254 | 348/36 |
| 2009/0003662 A1* | 1/2009 | Joseph | H04N 1/0045 | 382/118 |
| 2009/0189974 A1* | 7/2009 | Deering | G09G 3/02 | 348/46 |
| 2009/0237492 A1* | 9/2009 | Kikinis | H04N 13/0497 | 348/47 |
| 2009/0237564 A1* | 9/2009 | Kikinis | H04N 13/0497 | 348/584 |
| 2009/0238378 A1* | 9/2009 | Kikinis | H04N 13/0497 | 381/92 |
| 2010/0115411 A1* | 5/2010 | Sorokin | G03B 37/04 | 715/723 |
| 2010/0208033 A1* | 8/2010 | Edge | G06F 3/012 | 348/46 |
| 2010/0289878 A1* | 11/2010 | Sato | H04N 13/0239 | 348/46 |
| 2012/0038739 A1* | 2/2012 | Welch | G06T 15/04 | 348/14.01 |
| 2012/0127320 A1* | 5/2012 | Balogh | G02B 5/0257 | 348/180 |
| 2012/0327196 A1* | 12/2012 | Ohba | G06K 9/00281 | 348/49 |
| 2013/0038729 A1* | 2/2013 | Chang | H04N 13/0459 | 348/143 |
| 2013/0318476 A1* | 11/2013 | Sauve | G06F 9/4443 | 715/835 |
| 2014/0063188 A1* | 3/2014 | Smirnov | H04N 13/0018 | 348/43 |
| 2014/0092439 A1* | 4/2014 | Krig | G06T 9/001 | 358/2.1 |
| 2014/0098189 A1* | 4/2014 | Deng | H04N 13/0048 | 348/43 |
| 2014/0132744 A1* | 5/2014 | Wu | H04N 13/0033 | 348/55 |
| 2014/0139610 A1* | 5/2014 | Weber | G03B 37/04 | 348/14.03 |
| 2014/0198182 A1* | 7/2014 | Ward | H04N 13/0011 | 348/43 |
| 2014/0240464 A1* | 8/2014 | Lee | G01S 17/08 | 348/47 |
| 2015/0015660 A1* | 1/2015 | Weber | G03B 37/04 | 348/14.03 |

OTHER PUBLICATIONS

Lemaire, Thomas, et al., "SLAM with Panoramic Vision," Journal of Field Robotics, vol. 24, No. 1-2, 2007, pp. 91-111.

Salamin, P., et al., "Improved Third-Person Perspective: A Solution Reducing Occlusion of the 3PP?," Proceedings of the 7th ACM SIGGRAPH International Conference on Virtual-Reality Continuum and its Applications in Industry, (VRCAI '08), Biopolis, Singapore, Dec. 8-9, 2008, pp. 1-6.

Salamin, P., et al., "Intelligent Switch: An Algorithm to Provide the Best Third-Person Perspective in Augmented Reality," Proceedings of the 22nd Annual Conference on Computer Animation and Social Agents, (CASA 2009), Amsterdam, the Netherlands, Jun. 17-19, 2009, pp. 1-4.

Salamin, P., et al., "The Benefits of Third-Person Perspective in Virtual and Augmented Reality?," Proceedings of the ACM Symposium on Virtual Reality Software and Technology, ACM, (VRST'06), Limassol Cyprus, Nov. 1-6, 2006, pp. 1-4.

U.S. Appl. No. 13/909,690, filed Jun. 4, 2013 by Stéphane Côté et al. for a Panoramic Video Augmented Reality, pp. 1-24.

* cited by examiner

THIRD PERSON VIEW AUGMENTED REALITY

BACKGROUND

Technical Field

The present disclosure relates generally to augmented reality, and more specifically, to a technique for third-person view augmented reality.

Background Information

Augmented reality is a technology in which a view of a physical environment (i.e. a real-life environment) captured by a camera is merged with computer-generated graphics, text or other information (hereinafter "computer-generated features"), such that the computer generated features appear as if they are part of the physical environment. The result of this merging is an augmented reality view. The augmented reality view may be static (e.g., a still image) or dynamic (e.g., streaming video). In contrast to virtual reality, where a simulated environment is shown to a user instead of the physical environment, augmented reality blends the virtual with the real to enhance a user's perception of the physical environment.

Augmented reality has great potential in a variety of different fields, including the field of architecture, engineering and construction (AEC). In AEC, augmented reality may be used in performing a wide variety of tasks, including site planning, renovation visualization, system maintenance and repair, and asset identification and query, among others. Augmented reality may be used to show features that have not yet been constructed, that have been constructed but are not visible, and/or to provide information about features beyond what can be discerned by merely looking at them. For example, consider a renovation project where an architect, engineer, or construction contractor (generally, a user) is interested in modifying pipes hidden inside a wall. An augmented reality view may be of use to the user, allowing them to "see" the pipes through the wall. The pipes may be computer generated representations of pipes that are imposed upon a view of the actual wall. The user may use the augmented reality view to, among other things visualize and marking out the location of the pipes.

To be most useful however, the augmented reality view should be highly accurate. For the user to be able to rely upon the augmented reality view to make decisions, the computer generated features need to be registered accurately with the physical features. This registration needs to be maintained through viewing perspective changes. Returning to the above discussed pipe example, the computer generated representations of pipes need to be imposed at appropriate locations with respect to the wall, and should not "move" from these locations if the user changes viewing perspective.

However, registration has long been a challenge in the field of augmented reality. The challenges of registration are largely due to challenges in initialization and tracking. In general, "initialization" refers to techniques used to determine the initial position and orientation (i.e., the initial pose) of a camera that captures a view of the physical environment to be augmented. Similarly, "tracking" generally refers to techniques used to update the initial pose to reflect movement of the camera. A variety of different techniques have been developed to enable initialization and tracking. Among these are image-based techniques, which determine initial position and movement of a camera by detecting features in a captured view of the physical environment, matching those features to portions of a model of the physical environment. The features are typically lines, corners, or other salient details that can be reliably detected by feature detection algorithms. Image based-techniques generally work best when there are a large number of features, and the camera is moved slowly and steadily. They may work poorly when there are few or no detected features, and the camera is move rapidly or jerkily.

Users increasingly desire to utilize augmented reality upon handheld devices such as tablet computers and smartphones. However, use of such handheld devices may increase the likelihood of scenarios that challenge image-based techniques. When augmented reality is used with a handheld device, typically a camera of the handheld device is used to capture the view of the physical environment, and the augmented reality view is displayed on a screen of the handheld device. However, cameras typically found on handheld devices generally have a limited field of view (e.g., less than 120°), limiting the number of features they can capture. Further, if the moves their handheld device close to an object, the number of features visible may be decreased even further. For example, the entire field of view may be consumed by the surface of a relatively feature-less object. Further, users tend to move handheld devices in rapid, jerky manners, especially if their attention is divided with some other task. Such movements may make it more difficult to detect any features that may be present in the field of view.

Returning again to the above discussed pipe example, supposing the augmented reality view is based on a view of a wall captured from a camera of a handheld device. While trying to mark out locations on the wall, the user may move the handheld device close to the wall's surface. However, at close proximity, the entire field of view of the camera may be filled with the generally uniform, feature-less wall. Further, as the user is trying to visualize or mark pipe locations on the wall's surface, their attention may be divided, and the user may be prone to move the handheld device jerkily. As a result, tracking may be compromised.

In addition to problems with initialization and tracking, the typical implementation of augmented reality on handheld devices may suffer other shortcomings. Typically, an augmented reality view displayed on a screen of the handheld device is a first person view. The user generally does not see themselves (or at least a substantial portion of their body) in the displayed view. While this may initially seem appropriate, it can hinder the user's sense of integration into the augmented reality environment, and cause certain types of task to be difficult to perform. For example, tasks that require quick and accurate evaluation of distances may prove challenging with a first person augmented reality view. Returning again to the above discussed pipe example, a user may be called upon to estimate distances in order to mark out the location of pipes on the wall's surface. The user may need to walk a certain distance to reach an appropriate part of the wall, and then move their hand a certain distance to be able to mark upon a location on the wall. If estimating distances is difficult, the user may find it difficult to move to the exact location for marking.

Further, typical implementations of augmented reality on handheld devices hinder user interaction with the environment and extended viewing. Generally, a user must use hold the handheld device so the camera is directed in a desired orientation while an augmentation session is in progress. This may prevent two-handed work, as the user generally must use at least one hand to hold the handheld device. Further, this may be fatiguing, if a user desires to study a particular portion of the augmented reality view for a lengthy period of time. A user cannot generally place the handheld device on a surface, for example, rest it flat on a table top, to free their hands or provide a more comfortable working position. In a typical implementation, the change in orientation (e.g., with the camera now likely pointed down into the table top), would prevent meaningful augmentation.

Accordingly, there are is a need for new augmented reality techniques that may address some, or all, of these shortcomings.

SUMMARY

In one embodiment, the shortcomings of prior techniques are addressed by a third-person view augmented reality session that is based upon a panorama of the physical environment. The third-person view augmented reality session is displayed on a handheld device and controlled based on an orientation of the handheld device. The view being augmented, rather than originate from the handheld device, originates from a panoramic camera located at a separate, yet nearby, position.

More specifically, in one embodiment, the handheld device includes a touch screen display and an orientation sensor, among other hardware components. A separate backend unit is provided that includes a backend computing system and a panoramic camera. The handheld device executes a client side application, while the backend computing system executes a backend augmentation application. A user may hold the handheld device and approach an area he or she wishes to see an augmented view of. The panoramic camera may be mounted on a tripod positioned proximate to user, but at least some distance away, such that it can capture a panorama that includes at least a portion of the user's body and the area for which an augmented view is desired.

In operation, a communication link is established between the client side application and the backend augmentation application. The panoramic camera captures a panorama (e.g., in the form of a video stream) of the physical environment visible from its position in the physical environment, and sends the panorama to the backend application. The client side application utilizes the orientation sensor to determine the orientation of the handheld device, and conveys this orientation to the backend application. The client side application may also determine a zoom value based on input on the touch screen display, and conveys the zoom value to the backend application.

Based on the orientation and the zoom value, the backend augmentation application selects a portion of the captured panorama that is in a corresponding orientation and that provides a corresponding amount of zoom, to produce a view of the physical environment. The view of the physical environment will generally be a third-person view that may depict at least a portion of the body of the user in relation to physical features. The backend augmentation application augments the view of the physical environment to merge computer-generated features with it, to create an augmented reality view that may show a relationship between the portion of the user's body, the physical features, and the computer generated features. The augmented reality view is conveyed back to the handheld device and displayed by the client side application on the touch screen display.

Generally, if the user changes the orientation of the handheld device, this is conveyed to the backend augmentation application, which updates the augmented reality view to be based on a portion of the captured panorama that corresponds to the changed orientation of the handheld device. Similarly, if the user changes the zoom value, this may be conveyed to the backend augmentation application, which updates the augmented reality view. On occasion, the user may elect to freeze the orientation conveyed to the backend augmentation application. When orientation is frozen (i.e. fixed to remain set to a same orientation despite movements of the handheld device), the panoramic camera may continue to capture a panorama and a portion thereof may continue to be augmented. However, this portion may not be dynamically updated based on the present orientation of the handheld device. Use of a frozen orientation may permit the user to set the handheld device on a surface (e.g., a table top) to allow for two-handed work or to make extended viewing more comfortable.

If the user desires to see an augmented reality view for an area of the physical environment not covered by the present panorama, the user may move the panoramic camera. The backend augmentation application may use a tracking algorithm to determine a new position of the panoramic camera, and a panorama captured from the new position may be utilized for augmentation.

It should be understood that a variety of additional features and alternative embodiments may be implemented. This Summary is intended simply as an introduction to the reader, and does not indicate or imply that the examples mentioned herein cover all aspects of the invention, or are necessary or essential aspects of the invention.

BRIEF DESCRIPTION OF THE DRAWINGS

The detailed description below refers to the accompanying drawings of an example embodiment, of which.

DETAILED DESCRIPTION OF AN EXAMPLE EMBODIMENT

Figure 1:
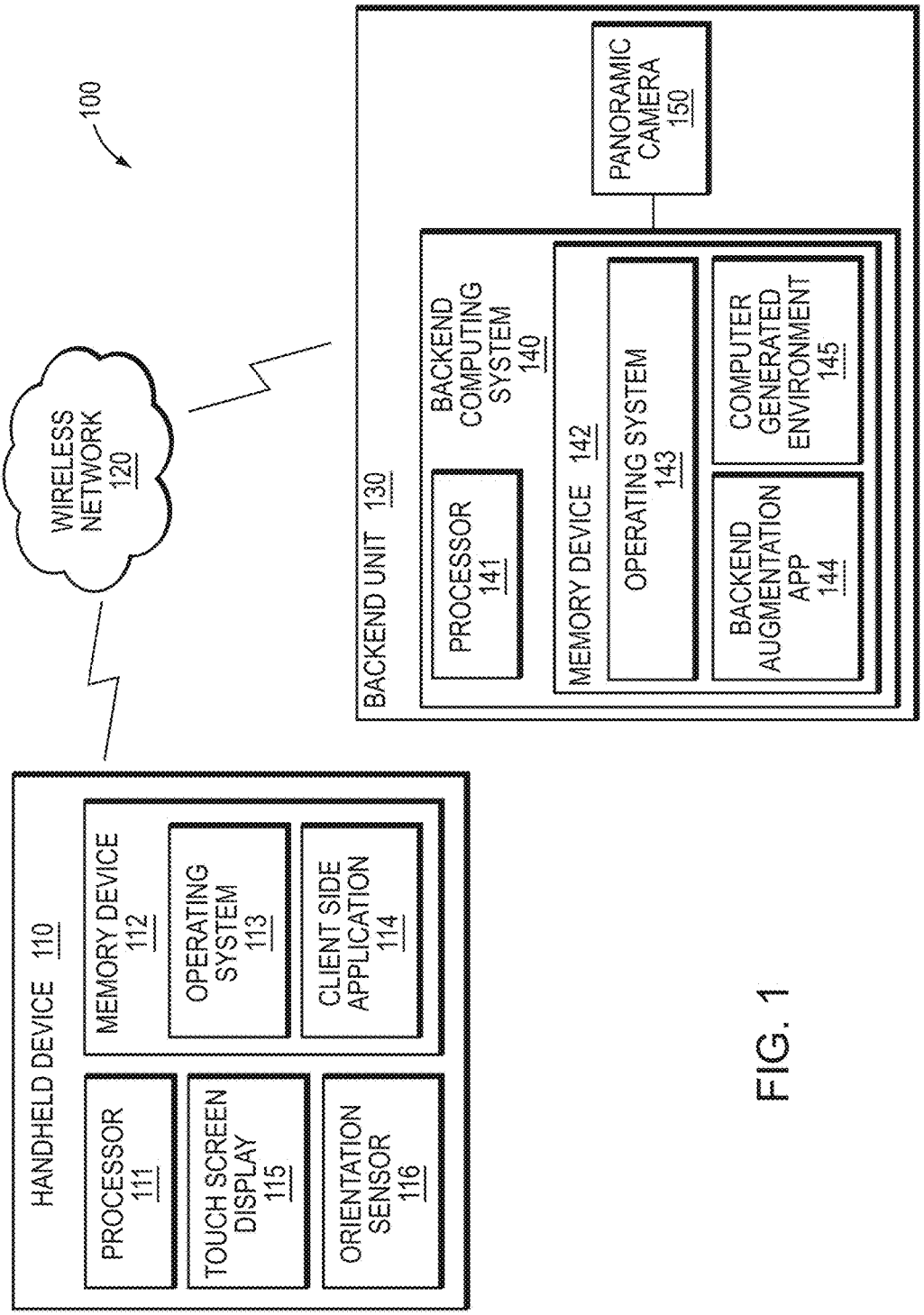
FIG. 1 is a block diagram of an example system 100 that may be used to provide a third-person view augmented reality session.

FIG. 1 is a block diagram of an example system that may be used to provide a third-person view augmented reality session. The example system includes a handheld device 110, which may communicate over a wireless network 120 (e.g., a WiFi network) with a separate backend unit 130 that includes a backend computing system 140 and a panoramic camera 150 coupled thereto.

As used herein, the term "handheld device" refers to a mobile computing device that is adapted to be used unsupported by a fixed surface, such as a table top. Devices such as tablet computers and smartphones are generally considered handheld devices since, even though they may be supported on occasion by a fixed surface, they are primarily designed to be used while being held by the user. Devices such as laptop computers and desktop computers are generally not considered handheld devices since, even though one could conceivably operate them while also holding them, they are generally not designed for that type of use. The handheld device 110 includes a processor 111 coupled to volatile and non-volatile memory devices 112 that, among other things, stores processor-executable instructions for an operating system 113 and a client side application 114. The handheld device 110 further includes one or more input/output devices, such as a touch screen display 115 upon which a user interface of the client side application 114 may be displayed. The user interface provides an augmented reality view generated using the techniques described herein. The handheld device 110 further includes an orientation sensor 116 that detects an orientation of the handheld device within the physical environment. The orientation sensor 116 may be composed of an accelerometer, a magnetometer and/or other types of sensing devices that enable determination of orientation.

The backend computing system 140 includes a processor 141 coupled to volatile and non-volatile memory devices 142 that, among other things, stores processor-executable instructions for another operating system 143, a backend augmentation application 144, and a computer-generated environment 145 (e.g., a computer aided design (CAD) model). The backend computing system 140 may take the form of a laptop computer, or another type of computing device. In some cases, the backend computing system may have substantially more computing power than the handheld device (e.g., a faster processor, more memory, etc.) The backend augmentation application 144 receives information, via the wireless network 120, from the client side application 114 on the handheld device 110, including an orientation of the handheld device determined by the orientation sensor 116, and a zoom value selected by a user by interacting with touch screen display 115, for example, by entering gestures (e.g., a single click to zoom in and a double click to zoom out, a two-finger "expand" to zoom in and a two-finger "pinch" to zoom out, etc.) upon the touch screen display. The backend augmentation application further receives a panorama of the physical environment (e.g., in the form of a video stream) from the panoramic camera 150. A panoramic camera 150 is a camera (e.g., a video camera) that has a panoramic field of view. As used herein, a panoramic field of view refers to a field of view that equals or exceeds the field of view of the human eye (generally considered 70° by 160°). A panoramic field of view may encompass 360° along a given plane, for example, along the horizontal plane. In some cases, a panoramic field of view may be a spherical field of view, which captures a substantial portion of a full sphere. In other cases, a panoramic field of view may take another form.

The panoramic camera 150 may be mounted on a tripod positioned proximate to the handheld device and its user, but at least some distance away. Generally, the panoramic camera may remain in this position for an extended period of time (e.g., the entire augmentation session). Using the panorama captured by the panoramic camera, the orientation, the zoom value from the handheld device 110, as well as the computer-generated environment (e.g. the CAD model) 145, the backend augmentation application 144 generates an augmented reality view, as discussed in more detail below. This augmented reality view is provided back to the client side application 114 on the handheld device 110, as also discussed below.

Figure 2:
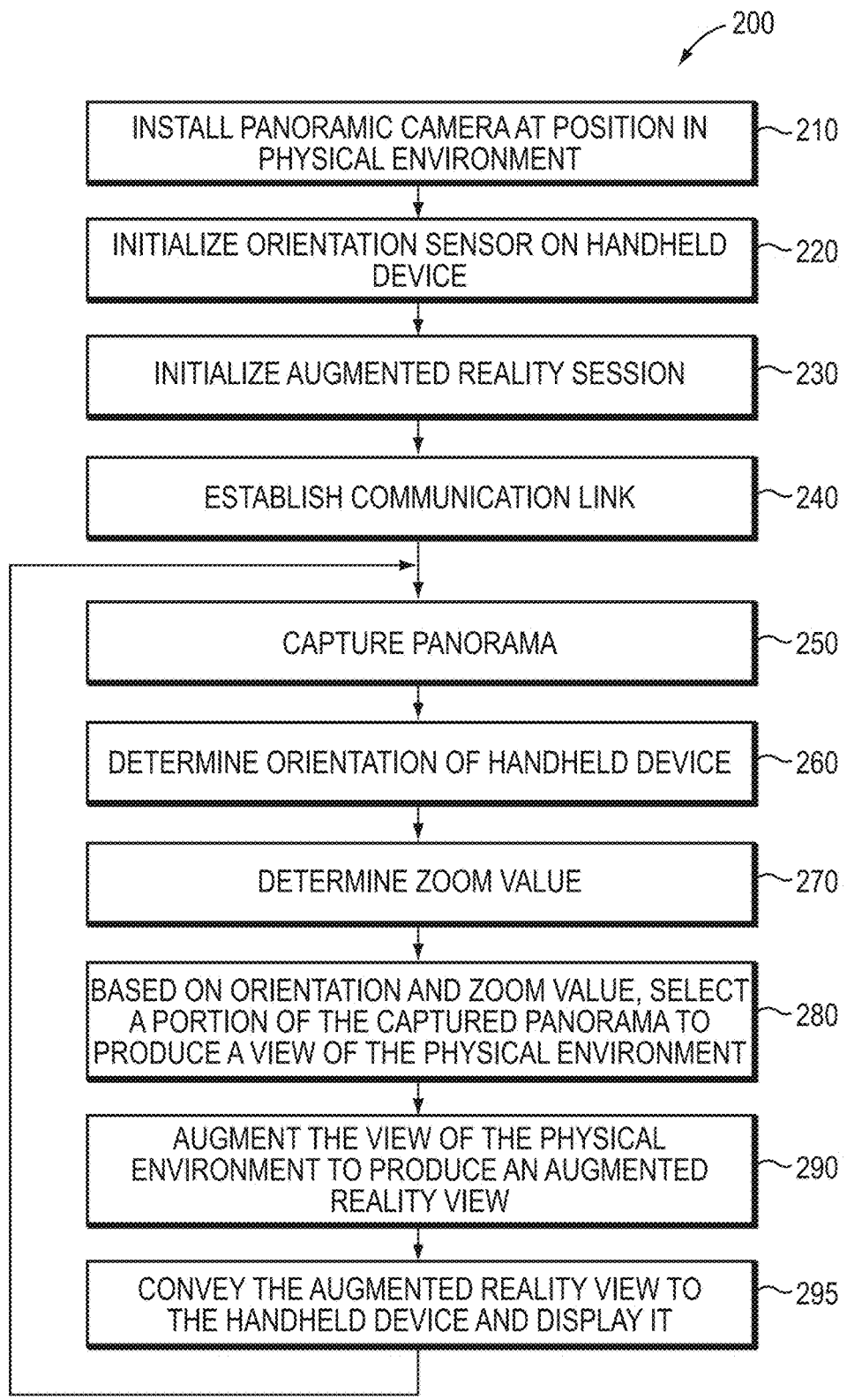
FIG. 2 is a flow diagram of an example sequence of steps that may utilize the system of FIG. 1 to provide a third-person view augmented reality session.

FIG. 2 is a flow diagram of an example sequence of steps that may utilize the system of FIG. 1 to provide a third-person view augmented reality session. At step 210, a user installs the panoramic camera 150 at a position in the physical environment (e.g., on the tripod). At step 220, the orientation sensor 116 is initialized with respect to an orientation of the panoramic camera 150, which serves as a reference orientation. Thereby an orientation measurement returned by the sensor 116 may indicate an orientation from the position of the panoramic camera 150. At step 230, the backend augmentation application 144 initializes an augmented reality session, by establishing a position and orientation of the panoramic camera 150 with respect to a coordinate system of the computer-generated environment (e.g., the CAD model) 145.

In one implementation, a "manual" augmented reality initialization process may used, where the user is asked to explicitly indicate correspondence between certain features in the panorama video stream captured by the panoramic camera and certain features in the computer-generated environment (e.g., the CAD model) 145. For example, at least a portion of the panorama and the computer-generated environment may be displayed to a user in an initialization user interface, provided on a screen (not shown) of the backend computing system 140, or on the touch screen display 115 of the handheld deco vice 110. Through an interactive process, a user may roughly align the panorama and the computer-generated environment (e.g., the CAD model), such that corresponding features in the two are proximate one another (e.g., physical features aligned with computer-generated features). The user may explicitly define correspondence, by selecting corresponding physical features of the panorama and computer-generated features of the computer-generated environment (e.g., the CAD model), to create correspondence pairs. Subsequently, a pose calculation algorithm of the backend augmentation application 144 may operate upon the correspondence pairs to determine an initial position an orientation of the panoramic camera 150 with respect to the coordinate system, to thereby initialize the augmented reality session Alternatively, the initial position and orientation needed to initialize the augmented reality session may be determined "semi-manually" or fully "automatically" using other techniques, which do not require a user to explicitly indicate correspondence.

At step 240, a communication link is established between the client side application 114 on the handheld device 110 and the backend augmentation application 144 on the backend computing system 140 via the wireless network 120. At step 250, the panoramic camera 150 captures a panorama (e.g., in the form of a video stream) of the physical environment visible from its position, and sends the panorama to the backend application 144 on the backend computing system 140. At step 260, the client side application 114 determines the orientation of the handheld device 110 (e.g., utilizing the orientation sensor 116). The client side application 114 then conveys this orientation to the backend application 144 via the communication link. At step 270, the client side application 114 determines a zoom value based on input in its user interface on the touch screen display 115. The zoom value indicates a degree of magnification desired in the displayed augmented reality view. As with the orientation, the client side application 114 then conveys this zoom value to the backend application 144 via the communication link.

At step 280, based on the orientation, and the zoom value, the backend augmentation application 144 selects a portion of the captured panorama that is in a corresponding orientation and provides a corresponding amount of zoom, to produce a view of the physical environment. The view of the physical environment will generally be a third-person view that depicts at least a portion of the body of the user of the handheld device in relation to physical features of the physical environment. At step 290, the backend augmentation application 144 augments the view of the physical environment to merge computer-generated features (e.g., from the CAD model) with it, to create an augmented reality view that shows a relationship between the portion of the user's body, the physical features, and the computer generated features. To augment the view, the backend augmentation application 144 may impose a virtual camera within the computer-generated environment (e.g., CAD model) at a position that corresponds to the position of the panoramic camera 150 in the physical environment. The virtual camera may be directed to have an orientation and a zoom value that corresponds to the orientation of the handheld device 110 in the physical environment and the zoom value provided by the handheld device 110. Computer-generated features (e.g., elements of the CAD model) as seen by the virtual camera may be superimposed upon, substituted for, or otherwise merged with physical features in the view of the physical environment as seen by the panoramic camera 150.

The augmentation performed by the backend augmentation application 144 may utilize the greater computing resources of the backend unit 130, enabling types of augmentation that would not be practicable to perform on the handheld device 110. In one configuration, the augmentation performed by the backend augmentation application 144 includes a virtual window. A virtual window may operate as a clipping box that penetrates a surface of a physical object (e.g., a wall). Where the view of the physical environment intersects the virtual window, it is clipped away (e.g., removed). Computer-generated elements (e.g., from the CAD model) that coincide with the clipped box may be displayed. As a result, computer-generated features that represent structures normally hidden from view (e.g., pipes in a wall, wiring in a ceiling, etc.) may be visible within the context of the view of the physical environment. The body of the user may be excluded from the clipping box and displayed on top of any computer-generated features, such that, should the user move (e.g., point with their arm) over the virtual window, their body will still be displayed, enabling live interaction. To provide such an effect, the backend augmentation application 144 may use a movement detection algorithm to detect moving objects (e.g., the moving arm of the user), cut out such moving objects from the rest of the scene, and superimpose them upon any computer-generated features that may augmented into the scene.

At step 295, the augmented reality view is conveyed back to the handheld device 110 via the communication link and displayed in the user interface of the client side application 114 on the touch screen display 115. Execution then loops back to step 250, where the panorama continues to be captured (e.g., new frames of the video stream) and, at step 260, orientation of the handheld device 110 is determined again. Generally, if the user changes the orientation of the handheld device 110, the new orientation will be used to update the augmented reality view. Such an updated augmented reality view may utilize a different portion of the captured panorama that corresponds to a new orientation of the handheld device 110. Similarly, if the user changes the zoom value, the augmented reality view will also be updated, with a different portion of the captured panorama that corresponds to the new value of zoom being used.

On occasion, the user may elect to freeze the orientation conveyed to the backend augmentation application. When orientation is frozen, the determined orientation at step 260 may be a fixed value, set to a prior orientation of the handheld device at a point in time when orientation was frozen. Rather than change based on movements of the handheld device (and its orientation sensor), the orientation used to determine the portion of the panorama augmented remains constant. Use of a frozen orientation may permit the user to set the handheld device on a surface (e.g., a table top), to allow for two-handed work or to make extended viewing more comfortable.

Generally, during an augmentation session, the panoramic camera 150 may remain at a fixed position for the duration of the augmented reality session, and as such, tracking need not be performed. This may allow the augmented reality view produced to be quite stable. However, on occasion, a user may desire to obtain an augmented reality view for an area beyond what is currently visible from the position of the panoramic camera 150. To do so, the user may relocate the panoramic camera 150. If the panoramic camera 150 is moved, the backend augmentation 144 application may execute a tracking algorithm to determine a new position and orientation of the panoramic camera, and a panorama captured from the new position may be utilized for augmentation. The augmentation session generally does not have to be re-initialized at the new camera position.

In one implementation, a tracking algorithm may be used that detects features in an initial frame of a sequence of video frames of the panorama (e.g., when the panorama takes the form of a video stream), using a feature detector. The initial frame is considered the "reference frame". The feature detector may be a per formant scale and rotation invariant feature detector, such as the Speeded Up Robust Features (SURF) feature detector, or another type of feature detector. The detected features in the reference frame may be projected onto the computer-generated environment (e.g., the 3-D model). The projection identifies corresponding features in the computer-generated environment (e.g., the 3-D model) where overlap occurs. A 3-D position of the corresponding features may be assigned to the detected features in the reference frame. The tracking process may then detect features in a subsequent video frame of the panorama, using the feature detector, and identifies detected features that match between the reference frame and the subsequent video frame. The result is a set of features in the subsequent video frame and in the reference frame that represent correspondence pairs. A pose calculation algorithm (for example, the same pose calculation algorithm used by the initialization process discussed above) may be executed upon the established correspondence pairs, to calculate a new position of the panoramic camera 150.

Figure 3:
FIG. 3 is a depiction of a user experiencing an example third-person view augmented reality session.

FIG. 3 is a depiction 300 of a user 310 experiencing an example third-person view augmented reality session. In this example, the user 310 is interested in visualizing pipes hidden inside a wall 320, for example, to mark their locations upon the wall or perform some other task related to them. The user 310 may hold the handheld device 110 with one hand, and orient it to point towards (e.g., direct the backside of the handheld device to face) an area of the physical environment (e.g., and area of the wall 320) where they desire to see an augmented reality view (e.g., of hidden pipes within the wall 320). The user may direct their attention at the touch screen display upon which the client side application displays the augmented reality view. The user may use their other hand to point or mark within the physical environment (e.g., to point to or mark upon the wall 320), for example, to indicate where the hidden pipes are located.

Figure 4:
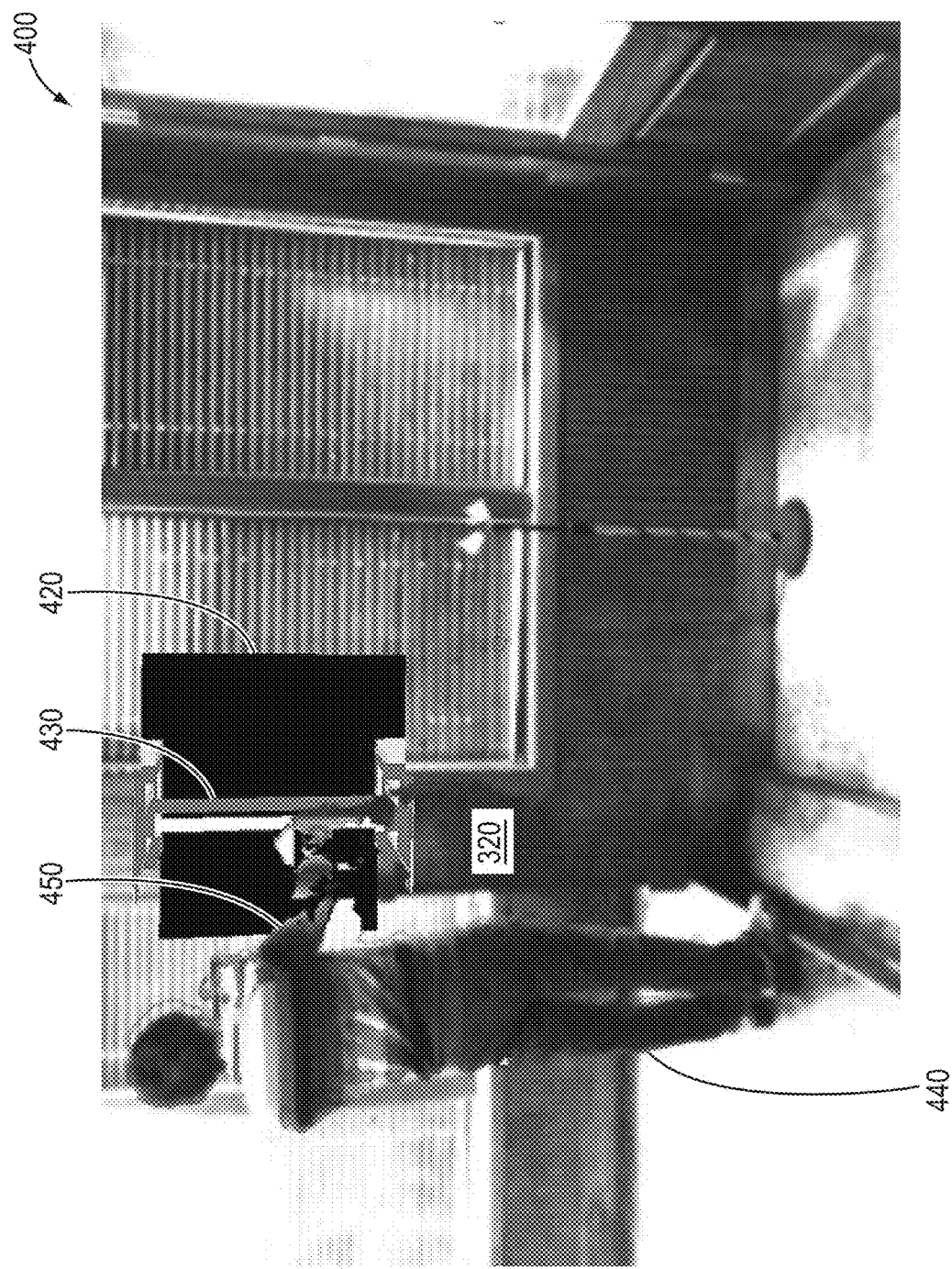
FIG. 4 is a screen shot of an example augmented reality view that may be displayed to the user of FIG. 3.

FIG. 4 is a screen shot of example augmented reality view 400 that may be displayed to the user of FIG. 3. The augmented reality view may be shown on the touch screen display of the handheld device. In the augmented reality view, physical features (e.g., a wall 320) are merged with computer-generated features (e.g., a virtual window 420 in which representation of hidden pipes 430 are displayed).

The user's body 440 is shown, so they may see themselves from a third-person perspective interacting with the augmented reality environment. Portions of their body 440 may be displayed overlaid upon the computer-generated features (e.g., their arm 450 being shown on top of part of the virtual window 420 and the pipes 430), so they may use the augmented reality view to position their body (e.g., their arm) precisely.

The above description describes a technique for third-person view augmented reality session that may address a number of shortcomings of the prior art. While an example embodiment is described, it should be apparent that the invention is not limited to this embodiment, and that a wide variety of modifications and/or additions may be made without departing from the disclosure's intended spirit and scope.

For example, while a handheld device is described above as performing a variety of functions, it should be understood that such functions may be performed by any of a variety of other types of mobile electronic devices. For instance, a wearable computing device that employs an optical head-mounted display (OHMD), such as the Google Glass® electronic glasses, may be used in place of the handheld device.

Further, certain operations are described as being conducted in software or hardware, it should be apparent that the techniques may be implemented in different combinations of software and hardware. Software implementations may, in general, include processor-executable instructions that implement applications stored in a non-transitory computer-readable medium, such as a volatile or persistent memory device, a hard-disk, a compact disk (CD), etc. Hardware implementations, in general, may include processors, memory chips, programmable logic circuits, application specific integrated circuits, and/or other types of hardware components. In conclusion, it should be understood that the above descriptions are meant to be taken only by way of example.

What is claimed is:

1. A method for providing a third-person view augmented reality session, comprising:
   capturing, by a backend unit, a panorama of the physical environment visible from a position within the physical environment;
   determining an orientation of a handheld device within the physical environment, the handheld device being separate from the backend unit and located a distance from the position;
   based on the orientation of the handheld device, selecting a portion of the captured panorama visible in a corresponding orientation from the position to produce a view of the physical environment, the view of the physical environment to show physical features of the physical environment and at least a portion of the user's body;
   augmenting the view of the physical environment to merge computer-generated features with the view of the physical environment to create an augmented reality view, the augmented reality view to show a relationship between the portion of the user's body, the physical features, and the computer-generated features; and
   displaying the augmented reality view on the handheld device.

2. The method of claim 1, further comprising:
   in response to a change in orientation of the handheld device, updating the augmented reality view to be based on a portion of the captured panorama that corresponds to the changed orientation of the handheld device.

3. The method of claim 1, further comprising:
   freezing the orientation of the handheld device, such that the selected portion of the captured panorama remains based on a same orientation despite subsequent movement of the handheld device.

4. The method of claim 1, further comprising:
   determining a zoom value selected on the handheld device, and
   wherein the portion of the captured panorama corresponds to the zoom value.

5. The method of claim 4, further comprising:
   in response to a change in zoom value, updating the augmented reality view to be based on a portion of the captured panorama that corresponds to the changed zoom value.

6. The method of claim 1, wherein the augmenting the view of the physical environment further comprises:
   imposing a virtual camera within a computer-generated environment, the virtual camera having a position that is based on the position within the physical environment from which the panorama was captured and the orientation of the handheld device; and
   generating the computer-generated features as seen by the virtual camera.

7. The method of claim 6, wherein the virtual camera has a zoom value that corresponds to a zoom value selected on the handheld device.

8. The method of claim 1, wherein the capturing a panorama is performed by a panoramic camera of the backend unit that is located at the position within the physical environment.

9. The method of claim 8, further comprising:
   initializing the third-person view augmented reality session by determining the position and an orientation of the panoramic camera within the physical environment.

10. The method of claim 9, wherein the initializing further comprises:
    establishing correspondence between physical features depicted in the panorama and computer-generated features of a computer-generated environment.

11. The method of claim 8, wherein the position of the panoramic camera is fixed for a duration of the third-person view augmented reality session.

12. The method of claim 8, further comprising:
    moving the panoramic camera within the physical environment;
    capturing another panorama of the physical environment visible after moving the panoramic camera;
    tracking the panoramic camera to determine a new position and orientation of the panoramic camera within the physical environment; and
    repeating the determining, the selecting and the augmenting using the another panorama as the panorama and the new position of the panoramic camera as the position within the physical environment.

13. The method of claim 1, wherein the augmenting is performed on the backend unit that is separate from the handheld device.

14. The method of claim 1, wherein the captured panorama is a video stream.

15. A non-transitory computer-readable medium that includes instructions executable on a processor, the instructions, when executed, operable to:

determine an orientation of a mobile electronic device within a physical environment;

based on the orientation of the mobile electronic device, produce a view of the physical environment from a position within the physical environment separate from the mobile electronic device, the view of the physical environment to show physical features of the physical environment and at least a portion of a user of the mobile electronic device's body;

augment the view of the physical environment to merge computer-generated features with the view of the physical environment to create an augmented reality view, the augmented reality view to show a relationship between the portion of the user's body, the physical features, and the computer-generated features; and display the augmented reality view.

16. The non-transitory computer-readable medium of claim 15, wherein the instructions, when executed, are further operable to:

in response to a change in orientation of the mobile electronic device, update the augmented reality view.

17. The non-transitory computer-readable medium of claim 15, wherein the instructions, when executed, are further operable to:

determine a zoom value selected on the mobile electronic device, and wherein the view of the physical environment is based on the zoom value.

18. The non-transitory computer-readable medium of claim 15, wherein the instructions, when executed, are further operable to:

impose a virtual camera within a computer-generated environment, the virtual camera having a position that is based on the position within the physical environment and the orientation of the handheld device; and generate the computer-generated features as seen by the virtual camera.

19. A system comprising a handheld device including a display and an orientation sensor, the handheld device configured to execute a client side application; and a backend unit including a panoramic camera and a computing system, the panoramic camera configured to capture a panorama of the physical environment visible from a position within the physical environment, the computing system configured to execute a backend augmentation application, wherein the client side application is configured to determine an orientation of the handheld device using the orientation sensor, and to provide the orientation of the handheld device to the backend augmentation application, the backend augmentation application is configured to, based on the orientation of the handheld device, select a portion of the captured panorama visible in a corresponding orientation from the position to produce a view of the physical environment, augment the view of the physical environment to merge computer-generated features with the view of the physical environment to create an augmented reality view, and provide the augmented reality view to the client side application, and the client side application is further configured to display the augmented reality view on the screen.

20. The system of claim 19, wherein the client side application is further configured to detect a change in orientation of the handheld device and to provide the change in orientation of the handheld device to the backend augmentation application, and the backend augmentation application is further configured to update the augmented reality view to be based on a portion of the captured panorama that corresponds to the changed orientation of the handheld device.

21. The method of claim 1, wherein the captured panorama includes physical features of the physical environment and the user's body as viewed from the position.

* * * * *